(12) United States Patent
Nagumo

(10) Patent No.: US 12,526,377 B2
(45) Date of Patent: Jan. 13, 2026

(54) INFORMATION PROCESSING APPARATUS, NON-TRANSITORY COMPUTER READABLE MEDIUM STORING PROGRAM, AND INFORMATION PROCESSING METHOD

(71) Applicant: FUJIFILM CORPORATION, Tokyo (JP)

(72) Inventor: Jun Nagumo, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 316 days.

(21) Appl. No.: 18/052,570

(22) Filed: Nov. 4, 2022

(65) Prior Publication Data

US 2023/0247161 A1 Aug. 3, 2023

(30) Foreign Application Priority Data

Feb. 2, 2022 (JP) ................................. 2022-015017

(51) Int. Cl.
*G06F 15/00* (2006.01)
*H04N 1/00* (2006.01)
*H04N 1/32* (2006.01)
*H04N 1/44* (2006.01)

(52) U.S. Cl.
CPC ..... *H04N 1/32096* (2013.01); *H04N 1/00514* (2013.01); *H04N 1/4446* (2013.01)

(58) Field of Classification Search
None
See application file for complete search history.

(56) References Cited

U.S. PATENT DOCUMENTS

| 11,611,675 | B2 * | 3/2023 | Noda | H04N 1/0097 |
| 2005/0264839 | A1 * | 12/2005 | Nemoto | G06F 21/608 |
| | | | | 358/1.15 |
| 2010/0007916 | A1 * | 1/2010 | Ikeda | H04N 1/444 |
| | | | | 358/1.15 |
| 2012/0075653 | A1 | 3/2012 | Takai | |

(Continued)

FOREIGN PATENT DOCUMENTS

| JP | 2006-344126 A | 12/2006 |
| JP | 2012073806 A | 4/2012 |

(Continued)

OTHER PUBLICATIONS

English language translation of the following: Office action dated Nov. 18, 2025 from the JPO in a Japanese patent application No. 2022-015017 corresponding to the instant patent application. This office action translation is submitted now in order to supplement the understanding of the cited references which are being disclosed in the instant Information Disclosure Statement.

*Primary Examiner* — Mark R Milia
(74) *Attorney, Agent, or Firm* — SOLARIS Intellectual Property Group, PLLC

(57) ABSTRACT

An information processing apparatus includes a processor configured to, in a case where an instruction to change a name associated with an operator that is associated with a process of transmitting target data to a transmission destination of destination information set in advance and is shared among plural users is received, set a display setting of the destination information associated with the operator to non-display of not displaying the destination information.

20 Claims, 17 Drawing Sheets

(56) References Cited

U.S. PATENT DOCUMENTS

| | | | |
|---|---|---|---|
| 2013/0278960 A1 | 10/2013 | Nishiyama | |
| 2018/0217797 A1 | 8/2018 | Inoue | |
| 2018/0220015 A1* | 8/2018 | Akuzawa | H04N 1/21 |
| 2022/0019393 A1* | 1/2022 | Hamada | G06F 3/1263 |
| 2022/0141352 A1* | 5/2022 | Mitsui | H04N 1/00411 |
| | | | 358/442 |

FOREIGN PATENT DOCUMENTS

| | | |
|---|---|---|
| JP | 2013106102 A | 5/2013 |
| JP | 2015114915 A | 6/2015 |
| JP | 2018-125687 A | 8/2018 |

\* cited by examiner

FIG. 4

EXAMPLE OF PERSONAL SETTING INFORMATION MANAGEMENT TABLE
(USER A)

| | NAME | TYPE | SETTING CONTENT | DATE AND TIME OF LAST USE | DISPLAY SETTING OF DESTINATION INFORMATION | PINNED |
|---|---|---|---|---|---|---|
| IN PINNED STATE | user1@sample.com, ANOTHER ONE ITEM | EMAIL TRANSMISSION | ADDRESS1: user1@sample.com ADDRESS2: user2@sample.com | - | NORMAL DISPLAY | ○ |
| | FAX TO TRAVEL COMPANY | FAX | DESTINATION: 045-123-4567 IMAGE QUALITY: PHOTO ORIGINAL DOCUMENT | - | NON-DISPLAY | ○ |
| JOB HISTORY INFORMATION | ¥¥user_A¥SHARE¥ | SCANNING | STORAGE LOCATION: ¥¥user_A¥SHARE¥ | 8/24/2021 16:03 | NORMAL DISPLAY | |
| | 1 COPY, BLACK AND WHITE, ONE-SIDED, 100%, A4 | COPYING | NUMBER OF COPIES: 1 COPY, COLOR: BLACK AND WHITE, PRINTING: ONE-SIDED, MAGNIFICATION: 100%, PAPER SHEET: A4 | 8/24/2021 15:58 | - | |
| | SCANNING TO USER A | SCANNING | STORAGE LOCATION: ¥¥user_A¥SHARE¥ | 8/24/2021 10:23 | NON-DISPLAY | |
| | APPLICATION SCANNING | SCANNING | STORAGE LOCATION: ¥¥Server¥SHARE¥ | 8/24/2021 9:22 | NON-DISPLAY | |
| | ... | ... | ... | ... | | |

FIG. 5

EXAMPLE OF SHARED SETTING INFORMATION MANAGEMENT TABLE

| NAME | TYPE | SETTING CONTENT | DISPLAY SETTING OF DESTINATION INFORMATION | CREATOR USER NAME |
|---|---|---|---|---|
| user1@sample.com, ANOTHER ONE ITEM | EMAIL TRANSMISSION | ADDRESS1: user1@sample.com<br>ADDRESS2: user2@sample.com | NORMAL DISPLAY | USER A |
| SUPPORT CENTER | EMAIL TRANSMISSION | ADDRESS: support@sample.co.jp | NON-DISPLAY | USER C |
| FAX TO TRAVEL COMPANY | FAX | DESTINATION: 045-123-4567<br>IMAGE QUALITY: PHOTO ORIGINAL DOCUMENT | NON-DISPLAY | USER B |

FIG. 9

EXAMPLE OF PERSONAL SETTING INFORMATION MANAGEMENT TABLE
(USER A)

| NAME | TYPE | SETTING CONTENT | DATE AND TIME OF LAST USE | DISPLAY SETTING OF DESTINATION INFORMATION | PINNED |
|---|---|---|---|---|---|
| REPORT SUBMISSION | EMAIL TRANSMISSION | ADDRESS1: user1@sample.com ADDRESS2: user2@sample.com | - | NON-DISPLAY | ○ |
| FAX TO TRAVEL COMPANY | FAX | DESTINATION: 045-123-4567 IMAGE QUALITY: PHOTO ORIGINAL DOCUMENT | - | NON-DISPLAY | ○ |
| ¥¥user_A¥SHARE¥ | SCANNING | STORAGE LOCATION: ¥¥user_A¥SHARE¥ | 8/24/2021 16:03 | NORMAL DISPLAY | |
| 1 COPY, BLACK AND WHITE, ONE-SIDED, 100%, A4 | COPYING | NUMBER OF COPIES: 1 COPY, COLOR: BLACK AND WHITE, PRINTING: ONE-SIDED, MAGNIFICATION: 100%, PAPER SHEET: A4 | 8/24/2021 15:58 | NORMAL DISPLAY | |
| SCANNING TO USER A | SCANNING | STORAGE LOCATION: ¥¥user_A¥SHARE¥ | 8/24/2021 10:23 | NON-DISPLAY | |
| APPLICATION SCANNING | SCANNING | STORAGE LOCATION: ¥¥Server¥SHARE¥ | 8/24/2021 9:22 | NON-DISPLAY | |
| ····· | ····· | ····· | ····· | | |

EXAMPLE OF SHARED SETTING INFORMATION MANAGEMENT TABLE

| NAME | TYPE | SETTING CONTENT | DISPLAY SETTING OF DESTINATION INFORMATION | CREATOR USER NAME |
|---|---|---|---|---|
| REPORT SUBMISSION | EMAIL TRANSMISSION | ADDRESS1: user1@sample.com<br>ADDRESS2: user2@sample.com | NON-DISPLAY | USER A |
| SUPPORT CENTER | EMAIL TRANSMISSION | ADDRESS: support@sample.co.jp | NON-DISPLAY | USER C |
| FAX TO TRAVEL COMPANY | FAX | DESTINATION: 045-123-4567<br>IMAGE QUALITY: PHOTO ORIGINAL DOCUMENT | NON-DISPLAY | USER B |

EX

INFORMATION PROCESSING APPARATUS, NON-TRANSITORY COMPUTER READABLE MEDIUM STORING PROGRAM, AND INFORMATION PROCESSING METHOD

CROSS-REFERENCE TO RELATED APPLICATIONS

This application is based on and claims priority under 35 USC 119 from Japanese Patent Application No. 2022-015017, filed on Feb. 2, 2022, the entire disclosure of which is incorporated by reference herein.

BACKGROUND

(i) Technical Field

The present invention relates to an information processing apparatus, a non-transitory computer readable medium storing a program, and an information processing method.

(ii) Related Art

JP2018-125687A discloses an image processing apparatus that can prevent non-display of a history of a job that a user wants to view in a case of displaying histories of jobs.

JP2006-344126A discloses a job information display device that can improve usability of a user compared to the related art by handling a problem that a user who executes a job cannot view a concealed item in a case where job information is displayed by hiding a concealment target item using a hiding text or the like.

SUMMARY

There has been suggested a technology for easily performing the same process as a process executed in the past by registering the process executed in the past in association with an operator and operating the operator in an information processing apparatus such as a multifunction peripheral. In a case where the operator associated with a process of transmitting target data to a transmission destination of destination information set in advance is shared among a plurality of users, the destination information of the transmission destination of the target data may be leaked.

Aspects of non-limiting embodiments of the present disclosure relate to an information processing apparatus, a non-transitory computer readable medium storing a program, and an information processing method that can prevent destination information of a transmission destination of target data from leaking from an operator shared among a plurality of users.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to, in a case where an instruction to change a name associated with an operator that is associated with a process of transmitting target data to a transmission destination of destination information set in advance and is shared among a plurality of users is received, set a display setting of the destination information associated with the operator to non-display of not displaying the destination information.

BRIEF DESCRIPTION OF THE DRAWINGS

Exemplary embodiment(s) of the present invention will be described in detail based on the following figures, wherein:

FIG. 4 is a diagram illustrating an example of a personal setting information management table stored in a setting information storage unit;

FIG. 5 is a diagram illustrating an example of a shared setting information management table stored in the setting information storage unit;

FIG. 9 is a diagram illustrating an example of the personal setting information management table after change;

FIG. 10 is a diagram illustrating an example of the shared setting information management table after change;

DETAILED DESCRIPTION

Next, an exemplary embodiment of the present invention will be described in detail with reference to the drawings.

Figure 1:
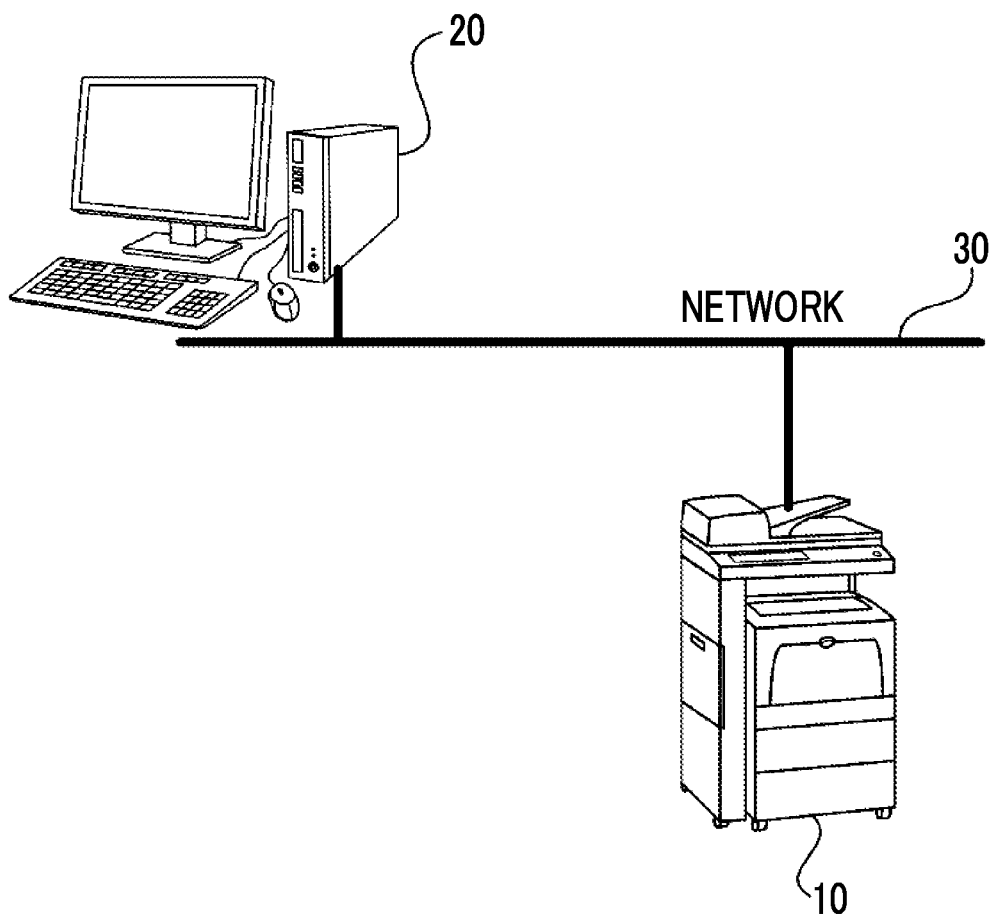
FIG. 1 is a diagram illustrating a system configuration of an image forming system of an exemplary embodiment of the present invention.

FIG. 1 is a diagram illustrating a system configuration of an image forming system of the exemplary embodiment of the present invention.

As illustrated in FIG. 1, the image forming system of the exemplary embodiment of the present invention is configured with an image forming apparatus 10 and a terminal apparatus 20 connected to each other via a network 30. The terminal apparatus 20 generates printing data and transmits the generated printing data to the image forming apparatus 10 via the network 30. The image forming apparatus 10 receives the printing data transmitted from the terminal apparatus 20 and outputs an image corresponding to the printing data on a paper sheet. The image forming apparatus 10 is an apparatus referred to as a so-called multifunction peripheral having a plurality of functions such as a printing function, a scanning function, a copying function, and a facsimile function. The image forming apparatus 10 is an example of an information processing apparatus according to the exemplary embodiment of the technology of the present invention.

Figure 2:
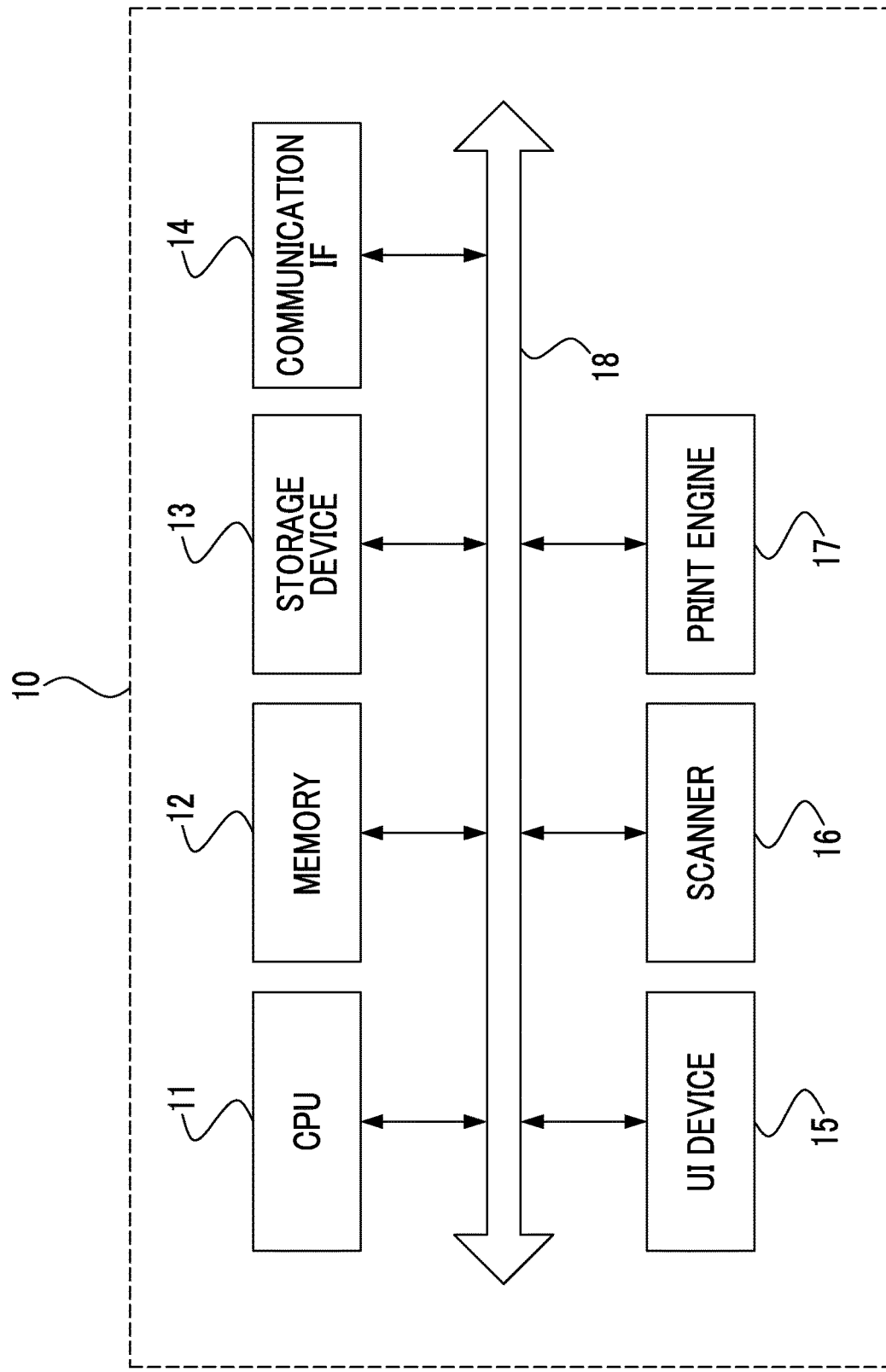
FIG. 2 is a block diagram illustrating a hardware configuration of an image forming apparatus in the exemplary embodiment of the present invention.

Next, a hardware configuration of the image forming apparatus 10 in the image forming system of the present exemplary embodiment is illustrated in FIG. 2.

As illustrated in FIG. 2, the image forming apparatus 10 includes a CPU 11, a memory 12, a storage device 13 such as a hard disk drive, a communication interface (abbreviated to IF) 14 that transmits and receives data to and from an external apparatus or the like via the network 30, a user interface (abbreviated to UI) device 15 that includes a touch panel or a liquid crystal display and a keyboard, a scanner 16, and a print engine 17. These constituents are connected to each other via a control bus 18.

The UI device 15 receives an instruction input from a user. The scanner 16 scans an original document loaded in the image forming apparatus 10 as image data. The print engine 17 prints the image on a recording medium such as a printing paper sheet through steps of electrostatic charging, exposure, development, transfer, fixing, and the like.

The CPU 11 is a processor that controls an operation of the image forming apparatus 10 by executing a predetermined process based on a control program stored in the memory 12 or the storage device 13. In the present exemplary embodiment, while the CPU 11 is described as reading and executing the control program stored in the memory 12 or the storage device 13, the present invention is not limited thereto. The control program may be provided in the form of a recording on a computer readable recording medium. For example, this program may be provided in the form of a recording on an optical disc such as a compact disc (CD)-read only memory (ROM) and a digital versatile disc (DVD)-ROM or in the form of a recording on a semiconductor memory such as a universal serial bus (USB) memory and a memory card. In addition, the control program may be acquired from the external apparatus via a communication line connected to the communication interface 14.

Figure 3:
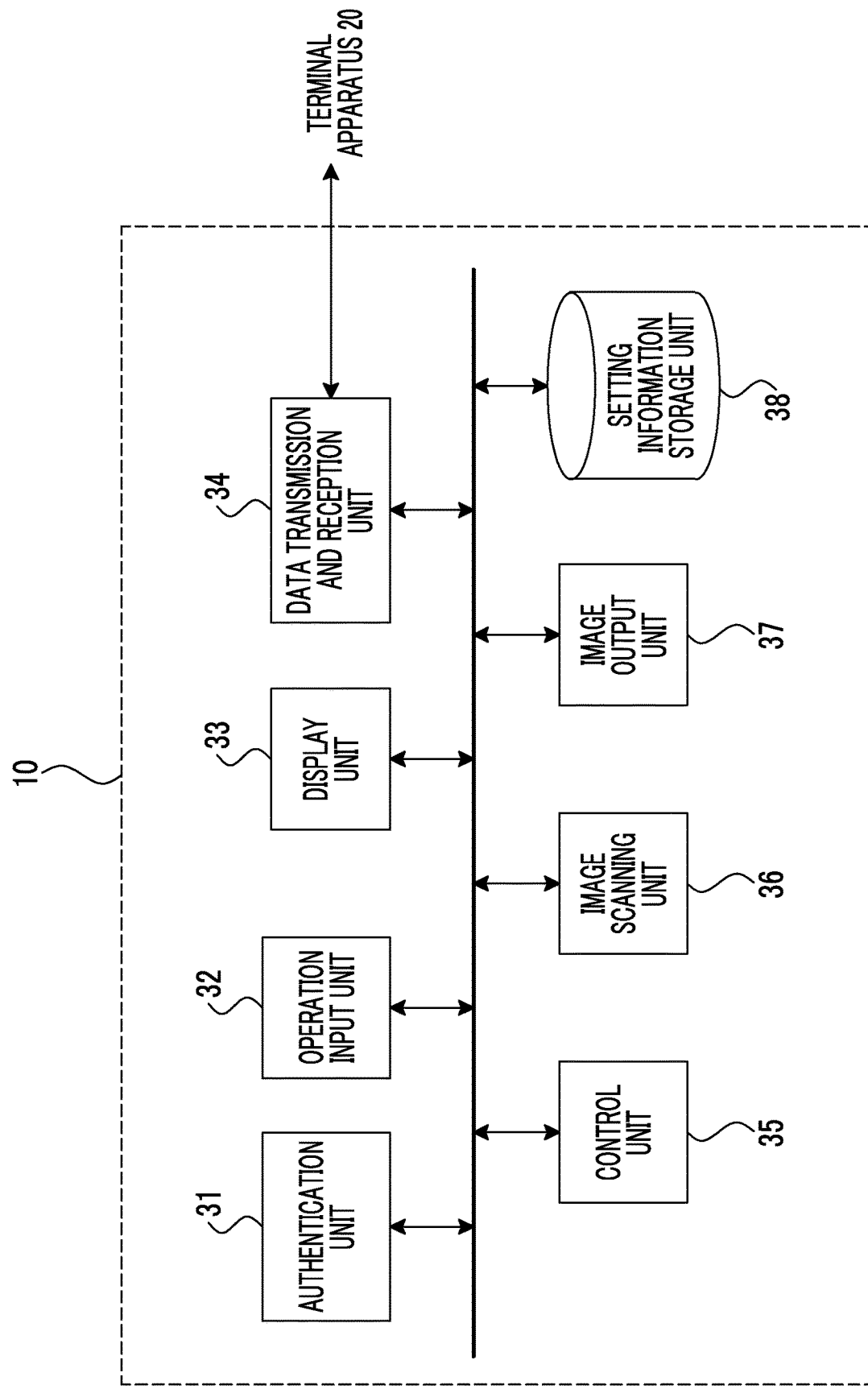
FIG. 3 is a block diagram illustrating a functional configuration of the image forming apparatus in the exemplary embodiment of the present invention.

FIG. 3 is a block diagram illustrating a functional configuration of the image forming apparatus 10 implemented by executing the control program.

As illustrated in FIG. 3, the image forming apparatus 10 of the present exemplary embodiment includes an authentication unit 31, an operation input unit 32, a display unit 33, a data transmission and reception unit 34, a control unit 35, an image scanning unit 36, an image output unit 37, and a setting information storage unit 38.

The authentication unit 31 executes an authentication process for a user who wants to use the image forming apparatus 10. The display unit 33 is controlled by the control unit 35 and displays various information to the user. The operation input unit 32 inputs information about various operations performed by the user.

The data transmission and reception unit 34 transmits and receives data to and from the external apparatus such as the terminal apparatus 20.

The control unit 35 controls an overall operation of the image forming apparatus 10 and performs a control of generating the printing data based on a printing job received from the terminal apparatus 20 via the data transmission and reception unit 34 and outputting the generated printing data from the image output unit 37, a control of scanning an original document image by the image scanning unit 36, and the like.

The image scanning unit 36 scans the original document image from a set original document under control of the control unit 35. The image output unit 37 outputs the image onto the recording medium such as a printing paper sheet under control of the control unit 35.

The setting information storage unit 38 stores job history information indicating an execution history of various jobs such as the printing job, a scanning job, a copying job, and a fax transmission job executed by the control unit 35 and setting information in which a setting value in executing a process of the job is stored for each setting item. Here, the job history information is history information of a processing content of the job executed in the past.

The setting information storage unit 38 stores a personal setting information management table for managing personal setting information usable by only a specific user and a shared setting information management table for managing shared setting information usable by a plurality of users.

In the image forming apparatus 10 of the present exemplary embodiment, a function of executing a new job using the setting content in the job executed in the past by selecting any job from the job history information and the personal setting information described above is provided as a quick function.

An example of the personal setting information management table stored in the setting information storage unit 38 is illustrated in FIG. 4. As illustrated in FIG. 4, in the personal setting information management table, the job history information of the job executed in the past and the personal setting information pinned by an operation of the user in the job history information are managed.

In the job history information, information about items such as a name of the job, a type, a setting content, a date and time of use, and a display setting of destination information is managed for each job. In the personal setting information, information about items such as the name of the job, the type, the setting content, and the display setting of the destination information is managed for each job.

Here, the "name" is a name in displaying the job on a display screen for using the quick function. In the present exemplary embodiment, as an initial setting of the "name", for example, at least a part of the setting content of the job is set as the name. However, the name can be arbitrarily changed by the user.

In addition, for example, the "type" is a type of process such as copying, faxing, and scanning in the job. In addition, the "setting content" is information related to a setting content necessary for executing the job. In addition, information about the "date and time of use" is a date and time in a case where the job is used.

In addition, for example, information about the "display setting of the destination information" is information related to a setting as to whether or not to display the destination information on the display screen in a case where the type of job is a process of transmitting target data to a transmission destination of the destination information set in advance, such as faxing and scanning. In a case where the display setting of the destination information is "normal display", the control unit 35 displays the destination information on the display screen. In a case where the display setting of the destination information is "non-display", the control unit 35 does not display the destination information on the display screen. Details of the display of the destination information will be described later.

In the present exemplary embodiment, while the "display setting of the destination information" is set to "normal display" as the initial setting, the display setting of the destination information can also be set to "non-display". In a case where the type of job is not the process, such as copying, of transmitting the target data to the transmission destination of the destination information set in advance, the "display setting of the destination information" is not set.

In a case where the user wants to execute the job having the same content as the setting content in the job executed in the past, the user can execute the job with the same setting content as the setting content in the job history information by selecting the job history information on the display screen for using the quick function.

Even the job history information is included in the personal setting information usable by only a specific user. That is, the job history information is personal setting information in a non-pinned state. In the following description, the setting information in the pinned state usable by only a specific user will be referred to as the personal setting information, and the setting information in the non-pinned state usable by only a specific user will be referred to as the job history information.

In a case where the job is executed by the user using the image forming apparatus 10, new job history information is generated each time the job is executed. However, a data storage region is limited, and the data storage region may be insufficient for storing all job history information. Thus, for example, an upper limit for leaving the job history information of only the most recent 200 jobs is set, and the job history information exceeding the upper limit is deleted in order of date and time of execution from the oldest.

Therefore, a job history not to be deleted can be set to be pinned so that the job history not to be deleted is not set as a deletion target. The job history set to be pinned is managed as the personal setting information and is left without being deleted even in a case where the number of jobs subsequently executed exceeds the upper limit.

For example, with reference to the personal setting information management table in FIG. 4, setting information of names "user1@sample.com, another one item" and "fax to travel company" that is pinned to be managed separately from normal job history information is perceived. That is, this pinned personal setting information is left regardless of the number of subsequently executed jobs and remains displayed on an operation screen. Thus, in a case where frequently used job history information is registered as the personal setting information by performing a pin operation on the frequently used job history information, the job can be executed with the same setting content using the personal setting information any number of times.

Here, for example, the personal setting information and the job history information illustrated in FIG. 4 are setting information usable by only a specific user such as a user A. However, a plurality of users may want to use such setting information. Thus, the personal setting information can be changed to shared setting information. The shared setting information is usable by all logged-in users.

An example of the shared setting information management table for managing the shared setting information is illustrated in FIG. 5. As illustrated in FIG. 5, in the shared setting information management table, information about items such as the name of the job, the type, the setting content, the display setting of the destination information, and a creator user name of the job is managed for each job.

For example, with reference to the shared setting information management table in FIG. 5, for the job having the name "user1@sample.com, another one item", the type of job is "email transmission". In addition, the setting content of the job is "address1: user1@sample.com" and "address2: user2@sample.com", the display setting of the destination information is "normal display", and the creator user name is "user A".

In the image forming apparatus 10 of the present exemplary embodiment, in using the quick function, the setting information used in executing the job can also be selected from the shared setting information in addition to the job history information and the personal setting information described above.

Figure 6:
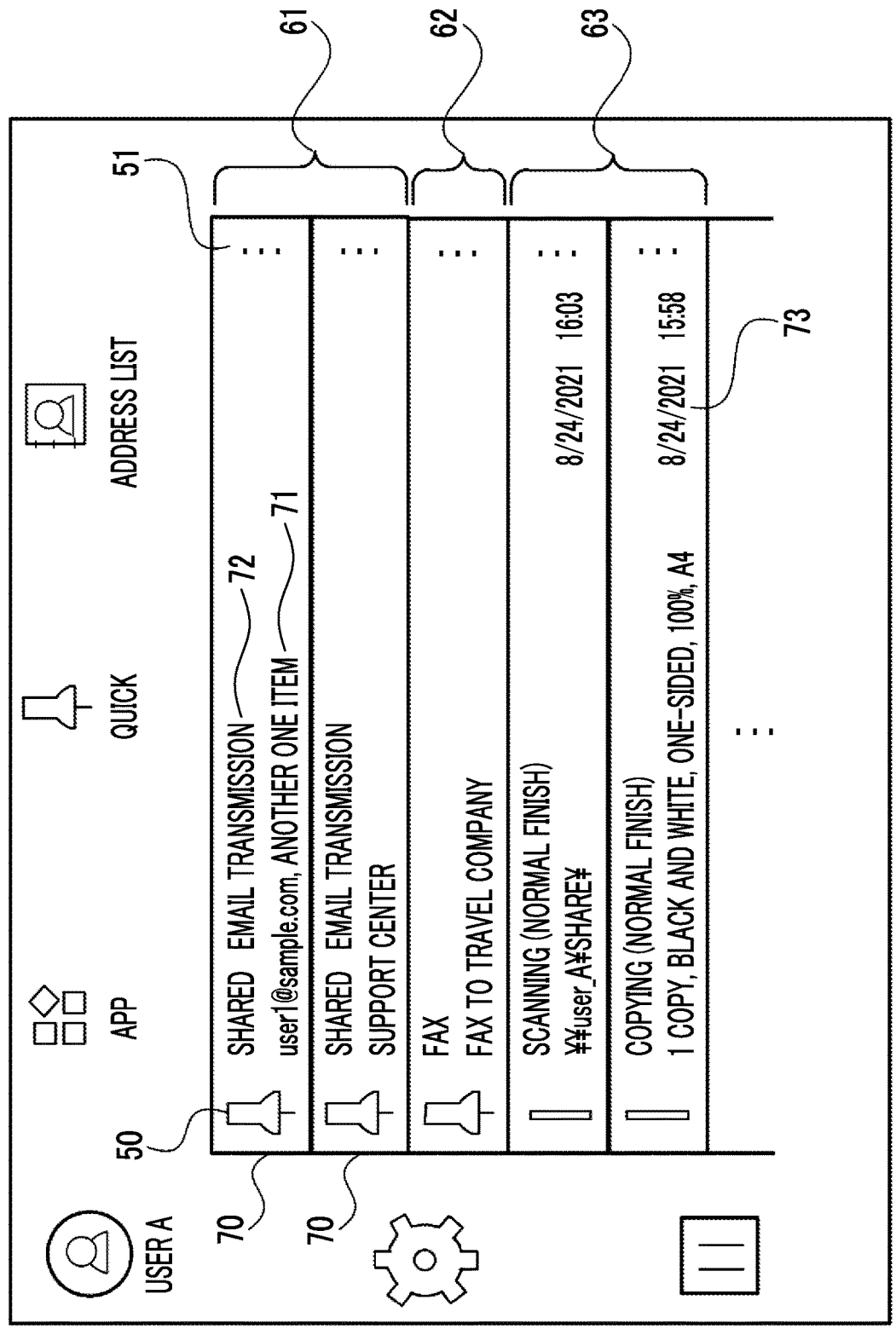
FIG. 6 is a diagram illustrating an example of a list display screen of setting information of a job displayed for using a quick function by a user.

An example of a list display screen of the setting information of the job displayed for using the quick function by the user is illustrated in FIG. 6. As illustrated in FIG. 6, on the list display screen of the setting information of the job, display of a list of shared setting information 61, personal setting information 62, and job history information 63 is perceived. In this list display, an icon 70 is displayed for each job, and by performing a touch operation on the icon 70, the user can use the job of the touched icon 70. That is, the icon 70 is an operator associated with the job.

The list display screen of the setting information of the job illustrated in FIG. 6 is an example of the display screen displayed in a case where the user A logs in in a state where the personal setting information management table illustrated in FIG. 4 and the shared setting information management table illustrated in FIG. 5 are stored in the setting information storage unit 38. Display of a part of the job history displayed on the list display screen of the job history is omitted because of a display space.

On the list display screen of the setting information of the job illustrated in FIG. 6, a name 71, a type 72, and a menu display button 51 of the job are displayed in each icon 70 of the shared setting information 61. In each icon 70 of the shared setting information 61, information indicating that the job is shared is displayed together in the item of the type 72 of the job.

The name 71, the type 72, and the menu display button 51 of the job are displayed in each icon 70 of the personal setting information 62.

In addition, the name 71, the type 72, a date and time of use 73, and the menu display button 51 of the job are displayed in each icon 70 of the job history information 63. In each icon 70 of the job history information 63, information indicating whether the job is normally finished or abnormally finished is displayed together in the item of the type 72 of the job.

A pin mark 50 indicating a pinned state is displayed in each icon 70 of the shared setting information 61 and the personal setting information 62.

In a case where the icon 70 is touched by the user on the list display screen of the setting information of the job, the control unit 35 transitions to a detailed setting screen of the job associated with the touched icon 70 from the list display screen of the setting information of the job. The name of the job, the setting content, a start button for executing the job, and the like are displayed on the detailed setting screen of the job. On the detailed setting screen of the job, the setting content of the job can be changed, and a display aspect of the setting content of the job changes depending on the type of job.

Figure 7:
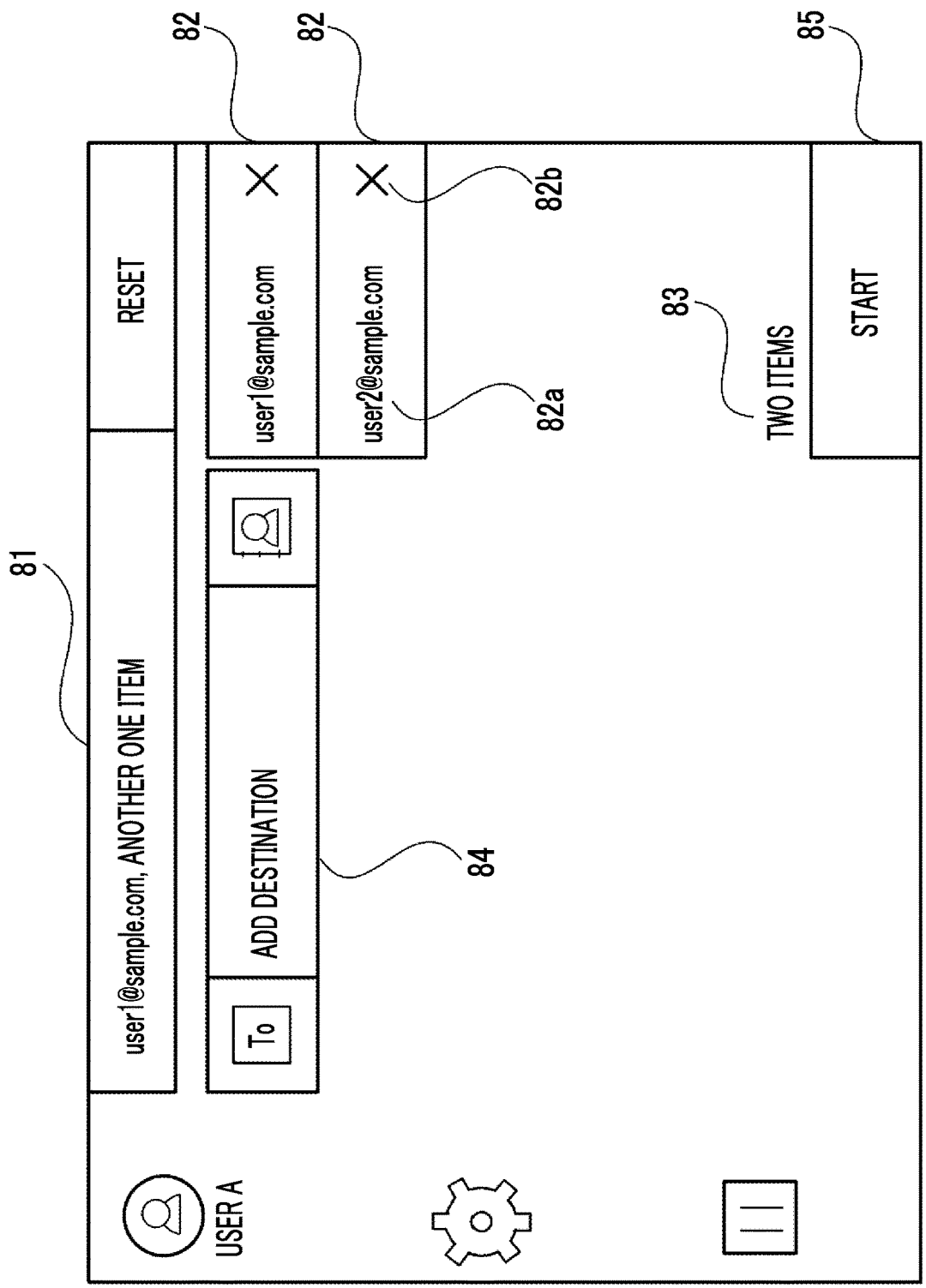
FIG. 7 is a diagram illustrating an example of a detailed setting screen of the job in a case where the job is email transmission.

An example of the detailed setting screen of the job in a case where the type of job is email transmission is illustrated in FIG. 7. As illustrated in FIG. 7, display of a name display unit 81 of the job, a destination information display unit 82 that is the setting content in a case of email transmission, a destination information quantity display unit 83, a destination addition input unit 84, and a start button 85 on the detailed setting screen in a case of email transmission is perceived.

The name of the currently selected job is displayed on the name display unit 81. Each destination information included in the job is individually displayed on the destination information display unit 82. An address 82a as the destination information and a delete button 82b for deleting the destination information are displayed on each destination information display unit 82. The quantity of pieces of the destination information included in the job is displayed on the destination information quantity display unit 83.

On the detailed setting screen of the job in a case where the job is email transmission, content of the address 82a can be changed by touching the address 82a of the destination information display unit 82. In addition, the destination information can be deleted by touching the delete button 82b of the destination information display unit 82. In a case where the destination information is deleted, the destination information display unit 82 on which the deleted destination information is displayed is deleted, and the display quantity of the destination information quantity display unit 83 is updated. In addition, the destination information can be added by touching the destination addition input unit 84. In a case where the destination information is added, the destination information display unit 82 on which the added destination information is displayed is newly displayed, and the display quantity of the destination information quantity display unit 83 is updated.

On the detailed setting screen of the job, in a case where the start button 85 is touched by the user, the control unit 35 executes the currently displayed job in accordance with the displayed setting content.

Figure 8:
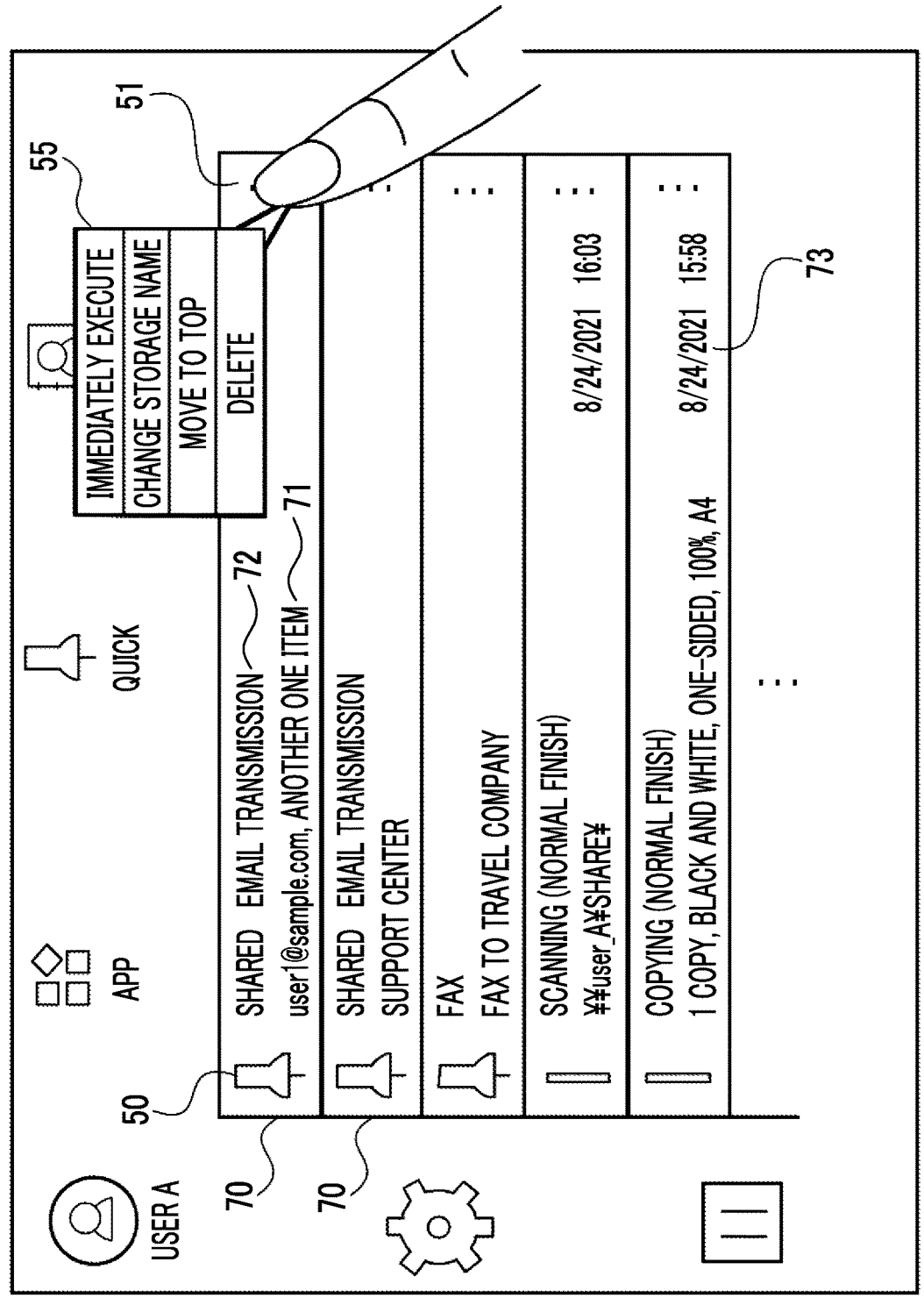
FIG. 8 is a diagram illustrating a display example of a menu display box for providing various instruction inputs with respect to the job associated with an icon.

In addition, a display example of a menu display box 55 for providing various instruction inputs with respect to the job associated with the icon 70 is illustrated in FIG. 8. On the list display screen of the setting information of the job, in a case where the menu display button 51 in the icon 70 is touched by the user, the control unit 35 displays the menu display box 55 of the process with respect to the job associated with the touched icon 70 as illustrated in FIG. 8. As an example, "immediately execute", "change storage name", "move to top", and "delete" are displayed in the menu display box 55.

In the menu display box 55, in a case where "immediately execute" is selected by the user, the control unit 35 executes the job associated with the icon 70 in accordance with the current setting content without transitioning to the detailed setting screen of the job.

In addition, in the menu display box 55, in a case where "change storage name" is selected by the user, the control unit 35 transitions to a screen for changing the name of the job associated with the icon 70 and causes the user to input a new name.

In addition, in the menu display box 55, in a case where "move to top" is selected by the user, the control unit 35 displays the icon 70 at a top of the list of jobs on the display screen for using the quick function.

In addition, in the menu display box 55, in a case where "delete" is selected by the user, the control unit 35 deletes the job associated with the icon 70 from the personal setting information management table and the shared setting information management table.

On the list display screen of the setting information of the job illustrated in FIG. 6, as new jobs are executed, the job history information 63 is sequentially deleted in order from the oldest. However, the shared setting information 61 and the personal setting information 62 to which the pin mark 50 is attached are not affected even in a case where new jobs are executed, and remain displayed in the same location without a change in display position.

In a case where the user wants to execute the job having the same content as the job executed in the past, the user can execute the job with an intended setting content without performing detailed setting, by simply touching the icon 70 of the job of the same or similar setting content to the setting content of the job to be executed from the displayed list of the shared setting information 61, the personal setting information 62, and the job history information 63.

For example, the user can execute email transmission to the same destination in the same manner as usual without inputting the destination information and the like, by simply touching the icon 70 of the shared setting information of the name "user1@sample.com, another one item".

Here, for example, in a case where the user A changes the icon 70 of the personal setting information 62 to the shared setting information 61, the changed icon 70 is used by not only the user A who has created the icon 70 but also the plurality of users. That is, even on the display screen displayed in a case where another user other than the user A has logged in, information such as the name 71 and the type 72 of the job associated with the icon 70 is displayed in the shared icon 70. In addition, the other user can display the setting content of the job associated with the icon 70 on the detailed setting screen of the job by touching the icon 70. Here, the user who has created the icon 70 is a user who executes the job associated with the icon 70 and is involved in creating the icon 70.

In a case where the shared job associated with the icon 70 is the job of transmitting the target data to the transmission destination of the destination information set in advance, the destination information of the transmission destination of the target data may be leaked to the other user from the icon 70 of the job.

For example, the job of the name "user1@sample.com, another one item" created by the user A as illustrated in FIG. 4 and FIG. 5 is changed to the shared setting information 61. Thus, even on the display screen of the other user, the icon 70 of the job of the name "user1@sample.com, another one item" is displayed on the display screen of the user A illustrated in FIG. 6.

A part of the destination information is included in the name 71 of "user1@sample.com, another one item" displayed in the icon 70 of the job. In addition, the other user can display all setting contents of the job on the detailed setting screen of the job by touching the icon 70 of the job. Thus, a setting of two items "user1@sample.com" and "user2@sample.com" as the destination information is known to the other user.

That is, since even the other user other than the user A who has created the icon 70 can know the destination information included in the job associated with the icon 70, the destination information of the transmission destination of the target data may be leaked from the icon 70.

Thus, in a case where an instruction to change the name associated with the icon 70 that is associated with the job of transmitting the target data to the transmission destination of the destination information set in advance and is shared among the plurality of users is received, the control unit 35 sets the display setting of the destination information associated with the icon 70 to the non-display of not displaying the destination information.

That is, in a case where the name of the job is changed from the initial setting in the icon 70 associated with the job of transmitting the target data to the transmission destination of the destination information set in advance, the control unit 35 assumes that the user wants to hide the destination information and sets the display setting of the destination information associated with the icon 70 to the non-display of not displaying the destination information.

In a case of performing display related to the job for which the display setting of the destination information is set to the non-display, the control unit 35 does not display the destination information in the name 71 of the job displayed in the icon 70 on the list display screen of the setting information of the job. In addition, the control unit 35 does not display the destination information on the detailed setting screen to which a transition is made from the icon 70.

For example, the "job of transmitting the target data to the transmission destination of the destination information set in advance" means a job of transmitting any data to an outside from the image forming apparatus 10, such as email transmission, faxing, and scanning. In addition, for example, the "destination information" means information for specifying the transmission destination of the target data, such as an email address, a telephone number, and a storage destination file path.

Here, as an example, a case where the name of the job associated with the uppermost icon 70 in which the name "user1@sample.com, another one item" is displayed on the list of the jobs on the list display screen of the setting information of the job illustrated in FIG. 6 is changed will be described.

As an example, in a case where an instruction to change the name of the job associated with the uppermost icon 70 from "user1@sample.com, another one item" to "report submission" is received from the user, the control unit 35 performs the following process.

As illustrated in the personal setting information management table after change in FIG. 9 and the shared setting information management table after change in FIG. 10, the control unit 35 changes a name of a corresponding job EX from "user1@sample.com, another one item" to "report submission". In addition, the control unit 35 changes the display setting of the destination information of the corresponding job EX from "normal display" to "non-display".

Figure 11:
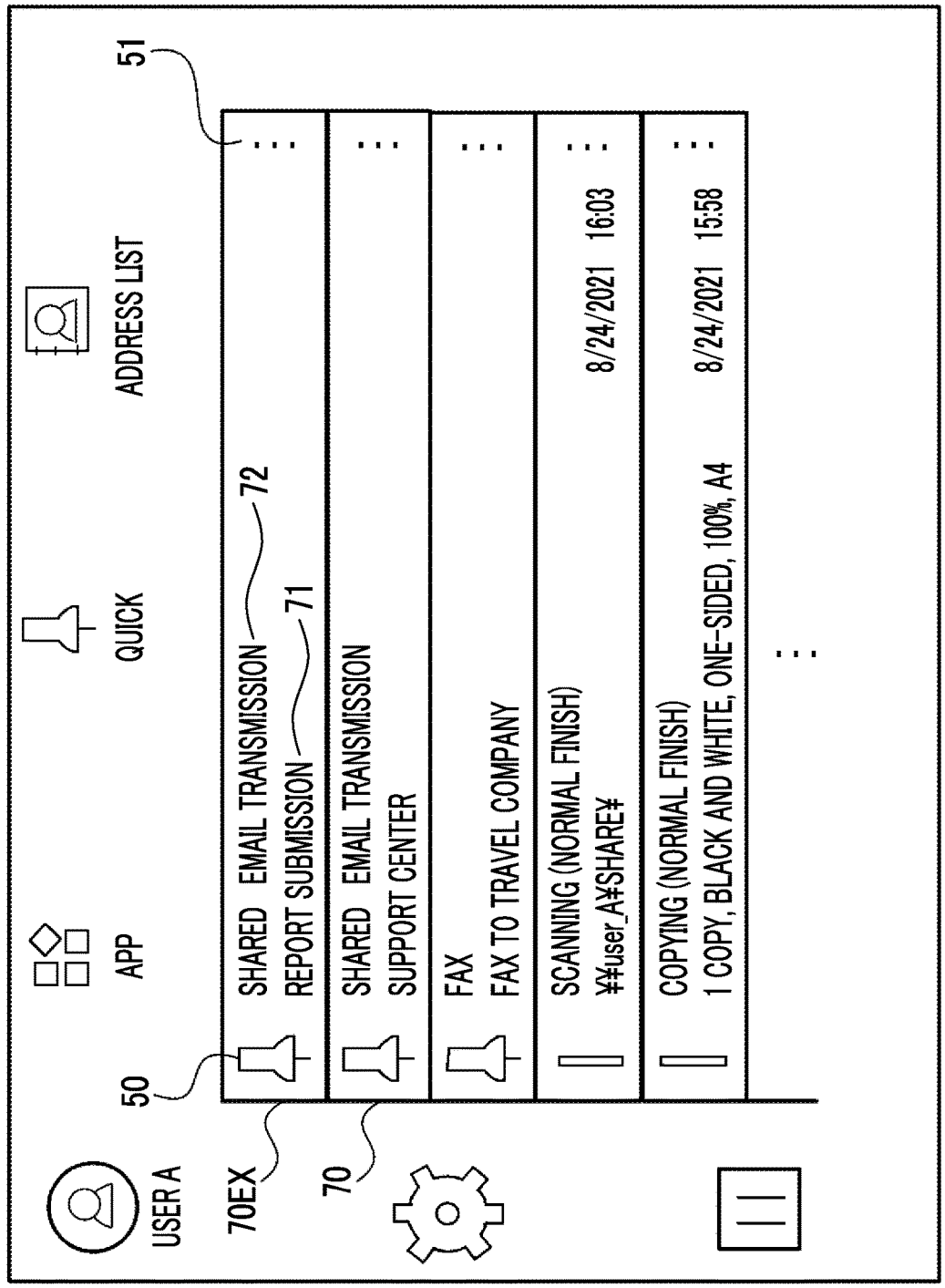
FIG. 11 is a diagram illustrating an example of a case of displaying the icon of the job for which a display setting of destination information is set to non-display on the list display screen of the setting information of the job.
Figure 12:
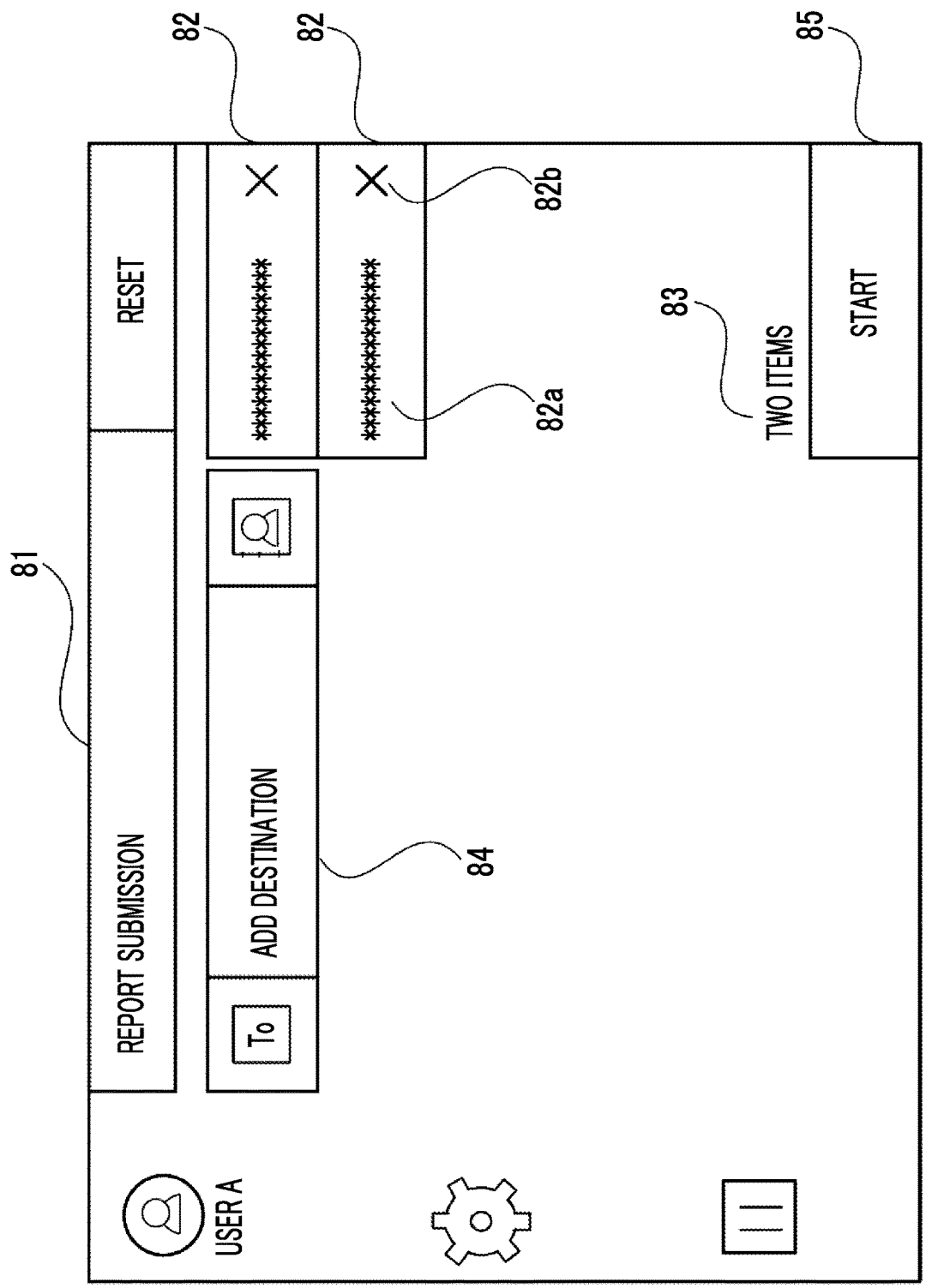
FIG. 12 is a diagram illustrating an example of the detailed setting screen of the job for which the display setting of the destination information is set to the non-display.
Figure 13:
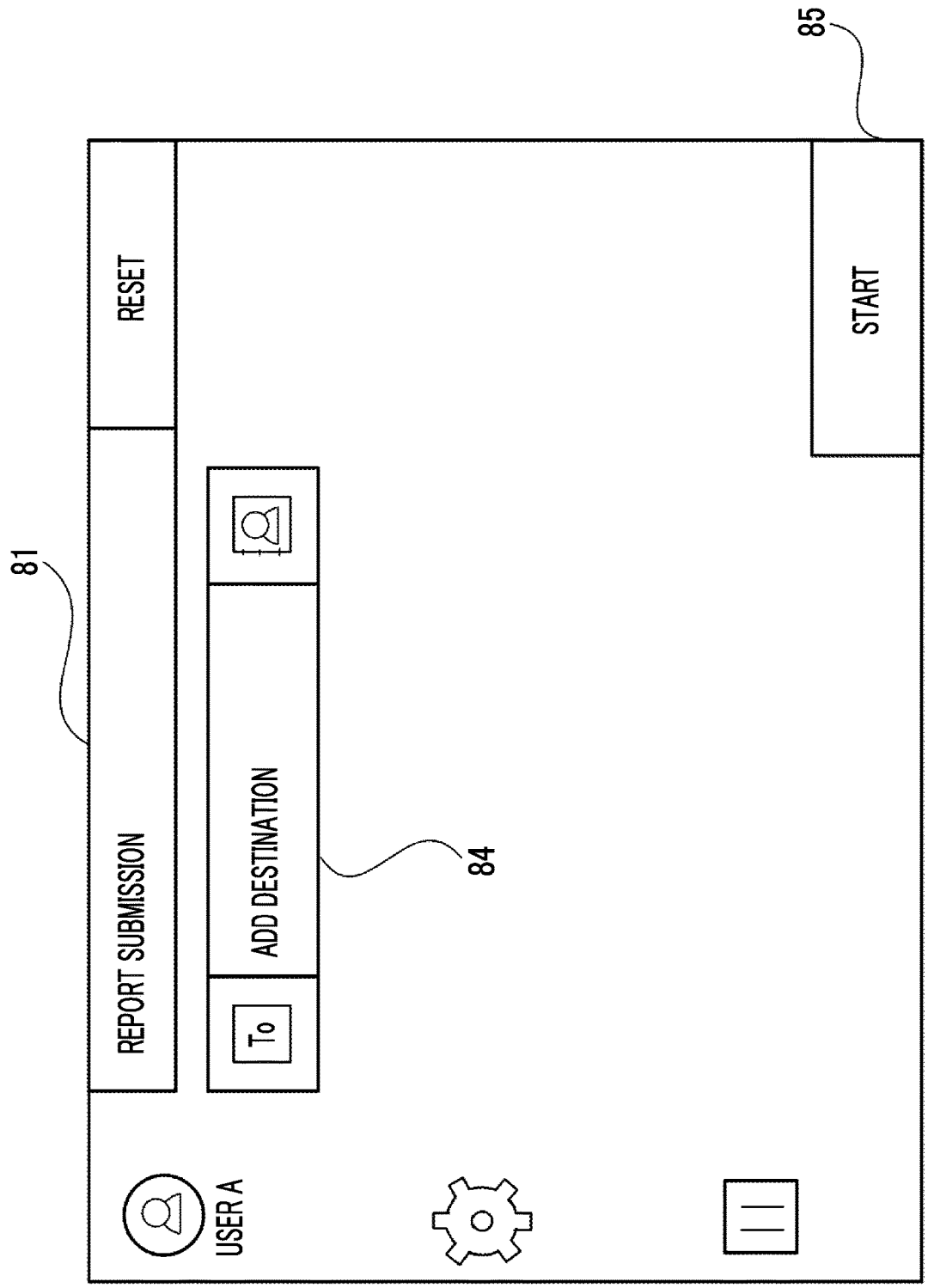
FIG. 13 is a diagram illustrating another example of the detailed setting screen of the job for which the display setting of the destination information is set to the non-display.

An example of a case of displaying the icon of the job for which the display setting of the destination information is set to the non-display on the list display screen of the setting information of the job is illustrated in FIG. 11. In addition, an example of the detailed setting screen of the job for which the display setting of the destination information is set to the non-display is illustrated in FIG. 12 and FIG. 13.

As illustrated in FIG. 11, in a case of displaying an icon 70EX of the job EX for which the display setting of the destination information is set to the non-display on the list display screen of the setting information of the job, the control unit 35 does not display the destination information in the name 71 of the job displayed in the icon 70EX.

In the present example, the name of the job is changed to "report submission", and the destination information is not included in the name. Thus, this content is displayed. However, in a case where the name after change includes the destination information, only the part of the destination information in the name is not displayed.

Here, in an aspect of not displaying the part of the destination information, hidden display in a form in which content of the destination information is not perceived may be performed. For example, the hidden display may be performed in any form as long as display is performed in the form of hiding the destination information, such as replacing each text showing the destination information with a symbol such as "*" or performing display in the form of covering the text showing the destination information with a rectangle. In a case where each text showing the destination information is replaced with the symbol such as "*", the number of displayed symbols may be a constant number regardless of the number of replaced texts. In addition, the text showing the destination information may not be displayed.

In addition, in a case of displaying content of the job EX for which the display setting of the destination information is set to the non-display on the detailed setting screen of the job, the control unit 35 does not display the destination information.

Here, in an aspect of not displaying the destination information, the hidden display in a form in which the content of the destination information is not perceived may be performed. For example, as illustrated in FIG. 12, the hidden display may be performed by replacing each text showing the address 82a in the destination information display unit 82 with the symbol such as "*". Besides, the hidden display may be performed in any form as long as display is performed in the form of hiding the address 82a, such as performing display in the form of covering the address 82a with a rectangle. In a case where each text showing the address 82a is replaced with the symbol such as "*", the number of displayed symbols may be a constant number regardless of the number of replaced texts. In such an aspect, it is possible to hide the content of the destination information while showing the quantity of pieces of the destination information to the user.

In addition, as illustrated in FIG. 13, on the detailed setting screen of the job, any display related to the destination information may not be performed. Specifically, the destination information display unit 82 and the destination information quantity display unit 83 displayed on the detailed setting screen of the job for which the display setting of the destination information is set to the normal display as illustrated in FIG. 7 are not displayed. In such an aspect, it is possible to completely hide the content of the destination information together with the quantity of pieces of the destination information from the user.

In a case where the name of the job associated with the icon 70 in the initial setting includes the destination information, and an instruction to change or delete at least a part of the destination information from the name of the job is received, the control unit 35 may set the display setting of the destination information associated with the icon 70 to the non-display.

In this case, in a case where the job associated with the icon 70 is not shared, the control unit 35 may set the display setting of the destination information associated with the icon 70 to the normal display of displaying the destination information. Here, "normal display" means normally displaying the destination information instead of not displaying the destination information.

In addition, in a case where an instruction to display content of the icon 70 associated with the job for which the display setting of the destination information is the non-display, for example, an instruction to display the detailed setting screen of the job, is received from a specific user, the control unit 35 may display the destination information associated with the icon 70.

Here, for example, the specific user is a manager user and the user who has created the icon 70 of which the content is to be displayed. The manager user is a user who is referred to as a machine manager and is granted broader authorization than the general user by requiring authentication such as input of a special password. The manager user is a user responsible for managing the apparatus.

In addition, in a case where the instruction to display the content of the icon 70 associated with the job for which the display setting of the destination information is the non-display is received, the control unit 35 may execute an authentication process set in advance and display the destination information associated with the icon 70 in a case where the authentication process has succeeded.

Here, for example, the authentication process set in advance may be any process such as a process of authentication using a password set in advance and a process of authentication using an IDentification (ID) card that is electronically readable in the image forming apparatus 10.

In addition, the control unit 35 may prohibit at least one of change or deletion of the destination information associated with the icon 70 associated with the job for which the display setting of the destination information is the non-display. In addition, the control unit 35 may prohibit addition of new destination information with respect to the icon 70 associated with the job for which the display setting of the destination information is the non-display. For example, these processes may not be performed with respect to the specific user such as the manager user and the user who has created the icon 70 of which the content is to be displayed.

In addition, the control unit 35 may display the destination information that is newly added with respect to the icon 70 associated with the job for which the display setting of the destination information is the non-display.

Next, an operation in the image forming apparatus 10 of the present exemplary embodiment will be described with reference to the flowcharts in FIG. 14 to FIG. 17.

Figure 14:
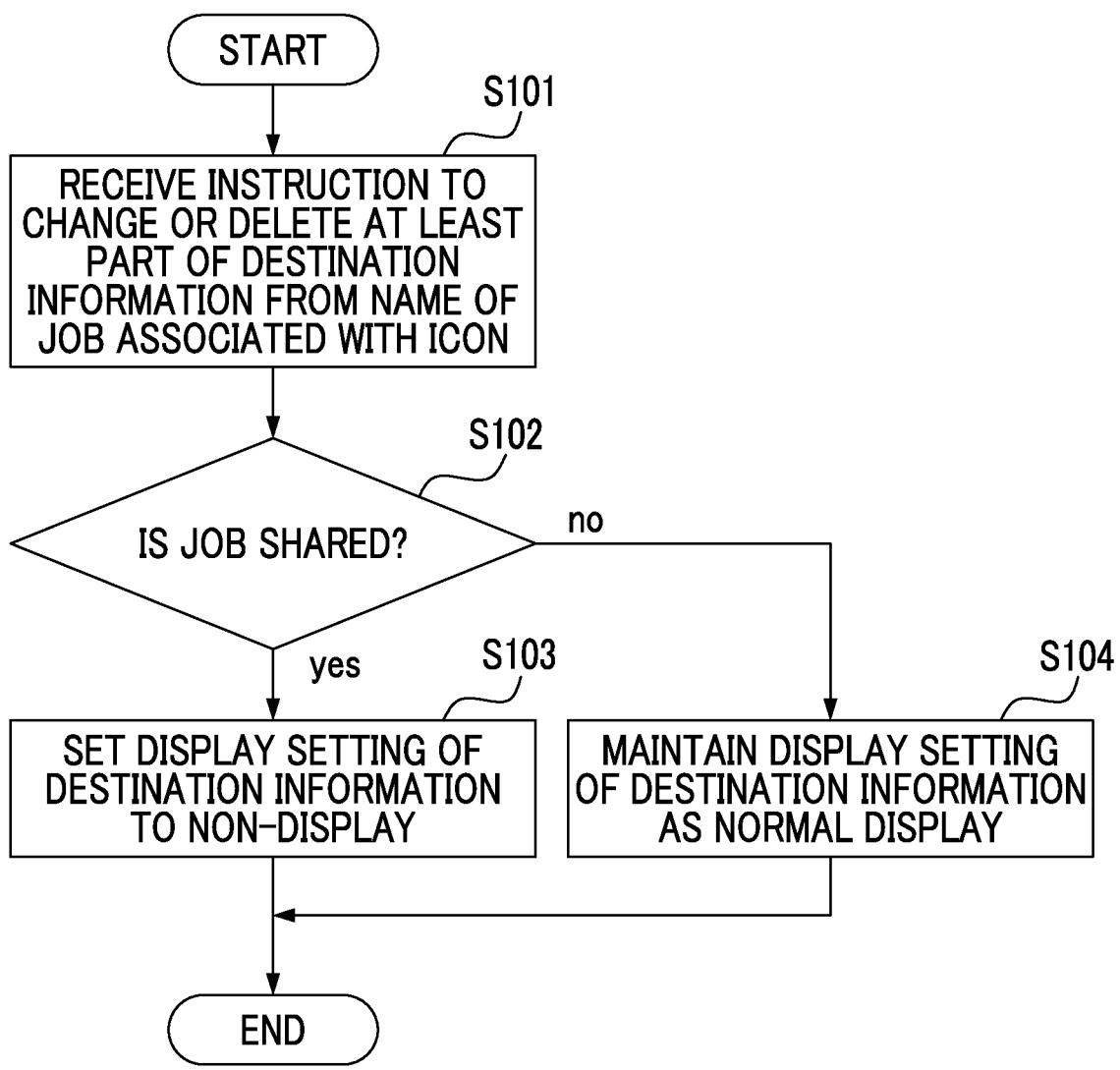
FIG. 14 is a flowchart for describing an operation in a case where an instruction to change or delete at least a part of the destination information from a name of the job associated with the icon is received.

First, an operation in a case where the instruction to change or delete at least apart of the destination information from the name of the job is received will be described with reference to the flowchart in FIG. 14.

In the present exemplary embodiment, the name of the job associated with the icon 70 in the initial setting includes the destination information. In addition, the display setting of the destination information of the job in the initial setting is set to the normal display.

In step S101, in a case where the instruction to change or delete at least a part of the destination information from the name of the job associated with the icon 70 is received, the control unit 35 determines whether or not the job is shared in step S102.

In step S102, in a case where a determination that the job is shared is made, the control unit 35 sets the display setting of the destination information of the job to the non-display in step S103 and finishes the process.

In step S102, in a case where a determination that the job is not shared is made, the control unit 35 maintains the display setting of the destination information of the job as the normal display in step S104 and finishes the process.

Figure 15:
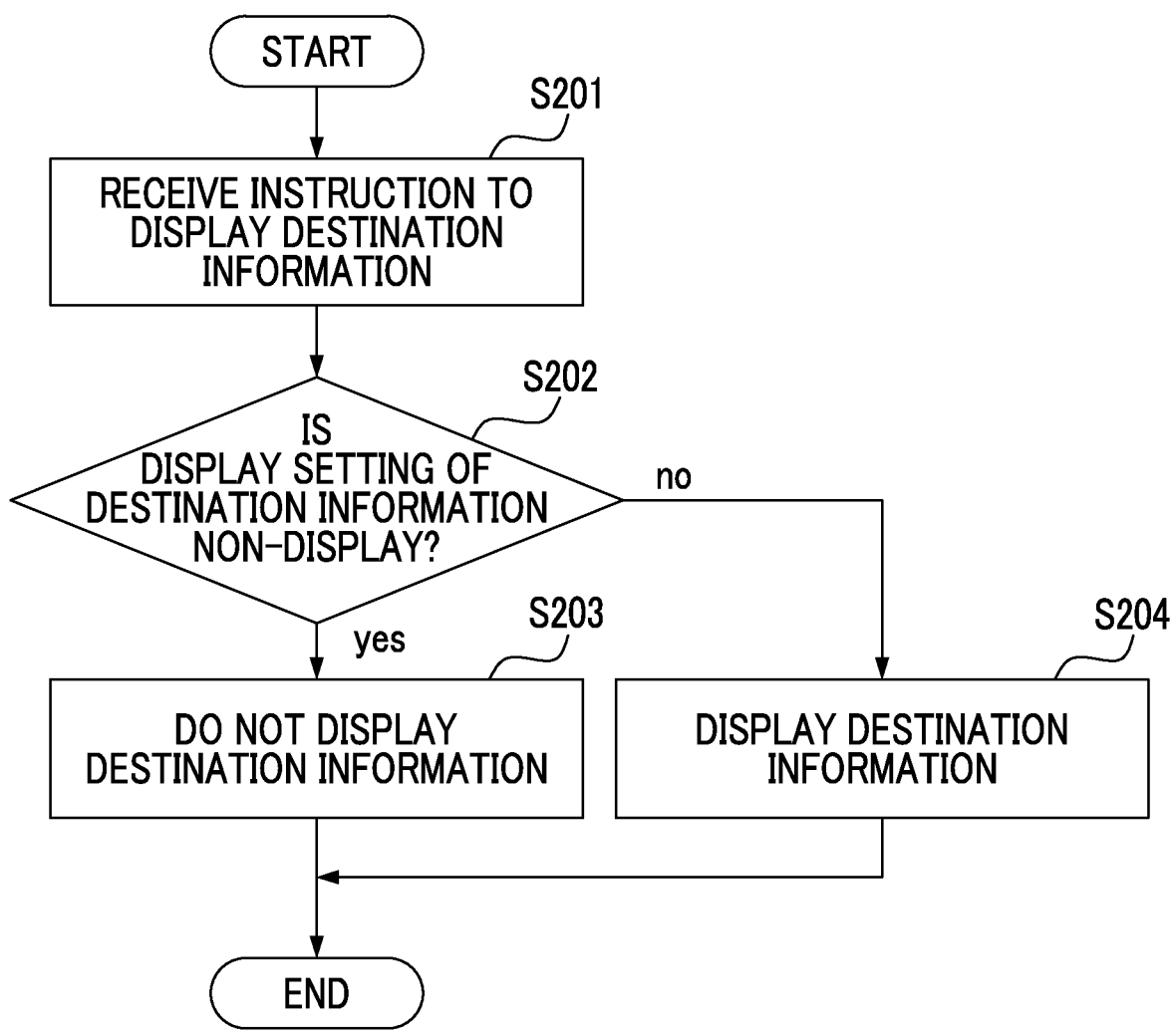
FIG. 15 is a flowchart for describing an operation in a case where an instruction to display the destination information of the job associated with the icon is received.
Figure 16:
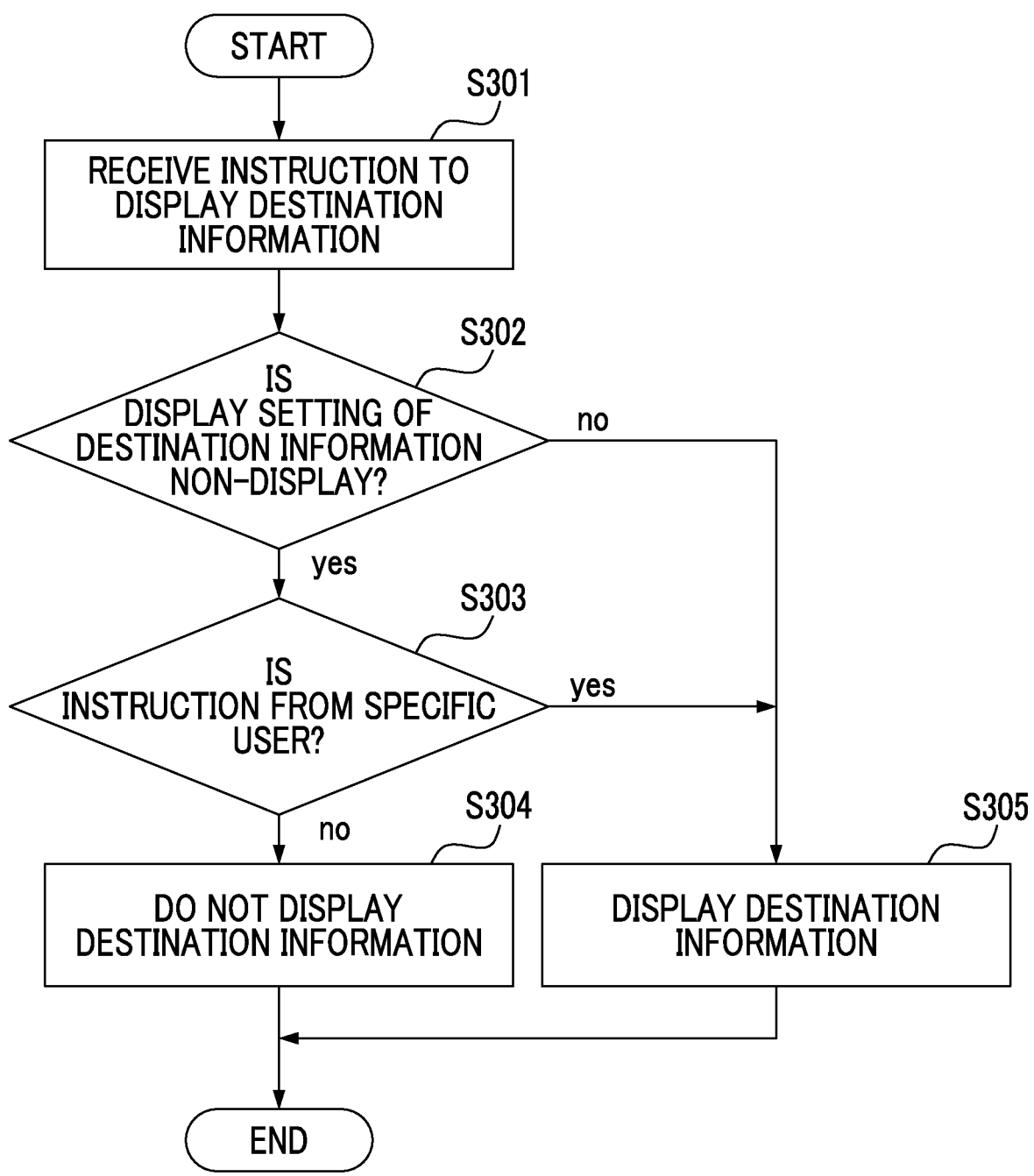
FIG. 16 is a flowchart for describing another operation in a case where the instruction to display the destination information of the job associated with the icon is received.
Figure 17:
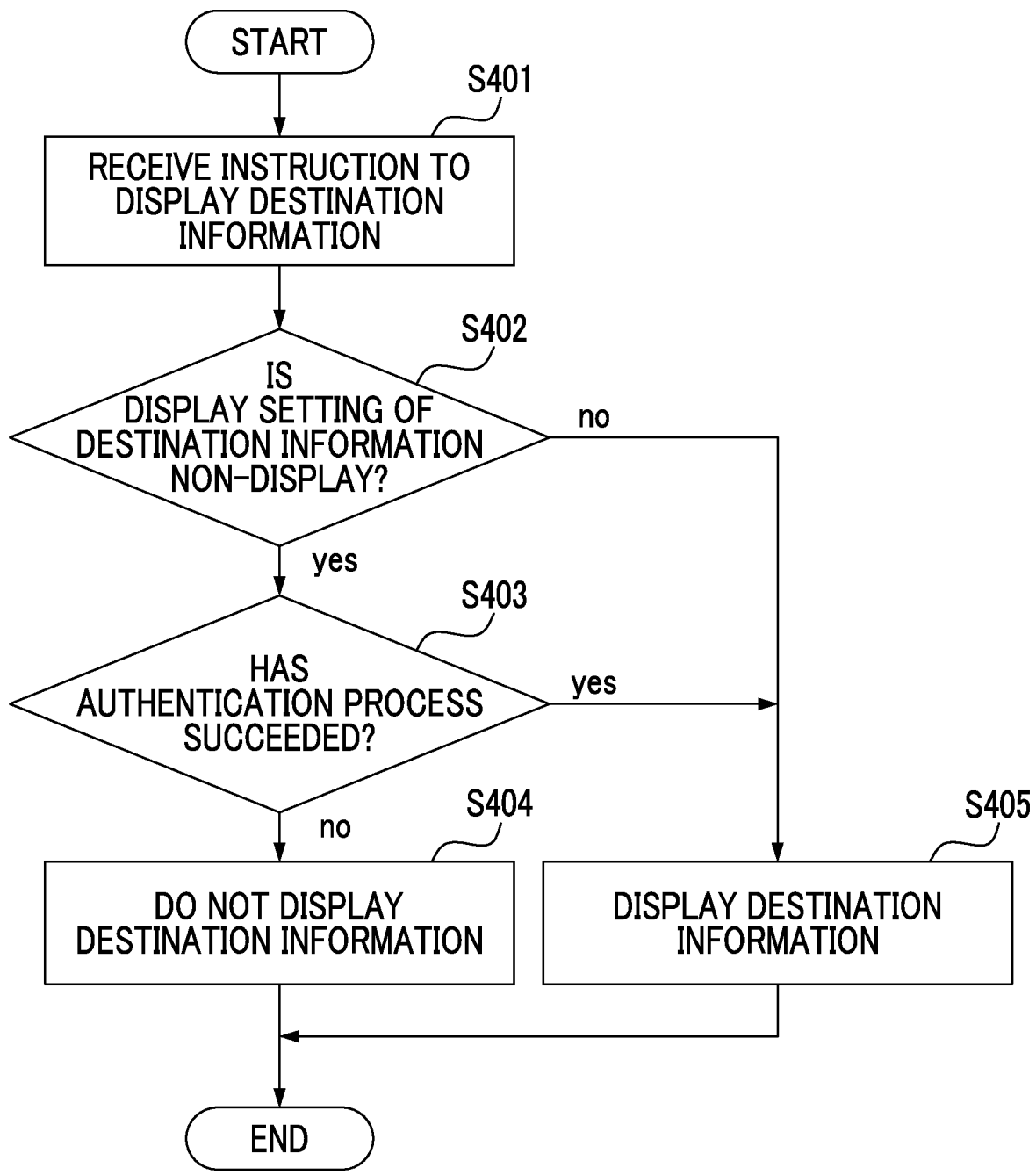
FIG. 17 is a flowchart for describing still another operation in a case where the instruction to display the destination information of the job associated with the icon is received.

Next, an operation in a case where an instruction to display the destination information of the job associated with the icon 70 is received will be described with reference to the flowchart in FIG. 15. The "instruction to display the destination information of the job" means an instruction to display a screen including the destination information of the job. In the present exemplary embodiment, this means displaying the list display screen of the setting information of the job and the detailed setting screen of the job.

In step S201, in a case where the instruction to display the destination information of the job associated with the icon 70 is received, the control unit 35 determines whether or not the display setting of the destination information of the job is the non-display in step S202.

In step S202, in a case where a determination that the display setting of the destination information is the non-display is made, the control unit 35 displays the screen for which the instruction is provided in the form of not displaying the destination information of the job in step S203 and finishes the process.

In step S202, in a case where a determination that the display setting of the destination information is not the non-display, that is, the display setting of the destination information is the normal display, is made, the control unit 35 displays the screen for which the instruction is provided in the form of displaying the destination information of the job in step S204 and finishes the process.

A different operation can be performed as the operation in a case where the instruction to display the destination information of the job associated with the icon 70 is received. The different operation will be described with reference to the flowchart in FIG. 16.

In step S301, in a case where the instruction to display the destination information of the job associated with the icon 70 is received, the control unit 35 determines whether or not the display setting of the destination information of the job is the non-display in step S302.

In step S302, in a case where a determination that the display setting of the destination information is the non-display is made, the control unit 35 determines whether or not the instruction to display the destination information of the job is an instruction from the specific user in step S303. In the present exemplary embodiment, the specific user is the manager user and the user who has created the icon 70 of which the content is to be displayed.

In step S303, in a case where a determination that the instruction to display the destination information of the job is not the instruction from the specific user, the control unit 35 displays the screen for which the instruction is provided in the form of not displaying the destination information of the job in step S304 and finishes the process.

In step S303, in a case where a determination that the instruction to display the destination information of the job is the instruction from the specific user, the control unit 35 displays the screen for which the instruction is provided in the form of displaying the destination information of the job in step S305 and finishes the process.

In addition, in step S302, in a case where a determination that the display setting of the destination information is not the non-display, that is, the display setting of the destination information is the normal display, is made, the control unit 35 displays the screen for which the instruction is provided in the form of displaying the destination information of the job in step S305 and finishes the process.

In addition, a still different operation can be performed as the operation in a case where the instruction to display the destination information of the job associated with the icon 70 is received. The different operation will be described with reference to the flowchart in FIG. 17.

In step S401, in a case where the instruction to display the destination information of the job associated with the icon 70 is received, the control unit 35 determines whether or not the display setting of the destination information of the job is the non-display in step S402.

In step S402, in a case where a determination that the display setting of the destination information is the non-display is made, the control unit 35 performs the authentication process and determines whether or not the authentication process has succeeded in step S403. In the present exemplary embodiment, for example, the authentication process is the process of authentication using the password set in advance, the process of authentication using the ID card electronically readable in the image forming apparatus 10, and the like.

In step S403, in a case where a determination that the authentication process has not succeeded is made, the control unit 35 displays the screen for which the instruction is provided in the form of not displaying the destination information of the job in step S404 and finishes the process.

In step S403, in a case where a determination that the authentication process has succeeded is made, the control unit 35 displays the screen for which the instruction is provided in the form of displaying the destination information of the job in step S405 and finishes the process.

In addition, in step S402, in a case where a determination that the display setting of the destination information is not the non-display, that is, the display setting of the destination information is the normal display, is made, the control unit 35 displays the screen for which the instruction is provided in the form of displaying the destination information of the job in step S405 and finishes the process.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Modification Example

While the exemplary embodiment is described using a case where the present invention is applied to an image forming apparatus forming an image on a recording medium, the present invention is not limited thereto. The present invention can also be applied to an information processing apparatus such as a personal computer or a portable terminal apparatus that stores process execution information set in advance for executing a process and executes the process using the stored process execution information.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
control an operator, which is an icon, which is used to execute a new job using setting content of a job executed in the past and is associated with a process of transmitting target data to a transmission destination of destination information set in advance, to be shared among a plurality of users; and
in a case where an instruction to change a name associated with the operator is received, set a display setting of the destination information associated with the operator to non-display of not displaying the destination information.

2. The information processing apparatus according to claim 1,
wherein a name of the operator in an initial setting includes the destination information, and
the processor is configured to:
in a case where an instruction to change or delete at least a part of the destination information from the name of the operator is received, set the display setting of the destination information associated with the operator to the non-display.

3. The information processing apparatus according to claim 2, wherein the processor is configured to:
in a case where the instruction to change or delete at least a part of the destination information from the name of the operator is received and the operator is not shared, set the display setting of the destination information associated with the operator to normal display of displaying the destination information.

4. The information processing apparatus according to claim 1, wherein the processor is configured to:
perform hidden display of hiding the destination information on the destination information of the operator for which the display setting of the destination information is set to the non-display.

5. The information processing apparatus according to claim 2, wherein the processor is configured to:
perform hidden display of hiding the destination information on the destination information of the operator for which the display setting of the destination information is set to the non-display.

6. The information processing apparatus according to claim 3, wherein the processor is configured to:
perform hidden display of hiding the destination information on the destination information of the operator for which the display setting of the destination information is set to the non-display.

7. The information processing apparatus according to claim 1, wherein the processor is configured to:
not perform any display related to the destination information of the operator for which the display setting of the destination information is set to the non-display.

8. The information processing apparatus according to claim 2, wherein the processor is configured to:

not perform any display related to the destination information of the operator for which the display setting of the destination information is set to the non-display.

9. The information processing apparatus according to claim 3, wherein the processor is configured to:
not perform any display related to the destination information of the operator for which the display setting of the destination information is set to the non-display.

10. The information processing apparatus according to claim 1, wherein the processor is configured to:
in a case where an instruction to display content of the operator for which the display setting of the destination information is set to the non-display is received from a specific user, display the destination information associated with the operator.

11. The information processing apparatus according to claim 2, wherein the processor is configured to:
in a case where an instruction to display content of the operator for which the display setting of the destination information is set to the non-display is received from a specific user, display the destination information associated with the operator.

12. The information processing apparatus according to claim 3, wherein the processor is configured to:
in a case where an instruction to display content of the operator for which the display setting of the destination information is set to the non-display is received from a specific user, display the destination information associated with the operator.

13. The information processing apparatus according to claim 10,
wherein the specific user is a manager user.

14. The information processing apparatus according to claim 10,
wherein the specific user is a user who has created the operator of which the content is to be displayed.

15. The information processing apparatus according to claim 1, wherein the processor is configured to:
in a case where an instruction to display content of the operator for which the display setting of the destination information is set to the non-display is received, execute an authentication process set in advance, and in a case where the authentication process has succeeded, display the destination information associated with the operator for which the display setting of the destination information is set to the non-display.

16. The information processing apparatus according to claim 1, wherein the processor is configured to:
prohibit at least one of change or deletion of the destination information associated with the operator for which the display setting of the destination information is set to the non-display.

17. The information processing apparatus according to claim 1, wherein the processor is configured to:
prohibit addition of new destination information with respect to the operator for which the display setting of the destination information is set to the non-display.

18. The information processing apparatus according to claim 1, wherein the processor is configured to:
display newly added destination information with respect to the operator for which the display setting of the destination information is set to the non-display.

19. A non-transitory computer readable medium storing a program causing a computer to execute a process comprising:
controlling an operator, which is an icon, which is used to execute a new job using setting content of a job executed in the past and is associated with a process of transmitting target data to a transmission destination of destination information set in advance, to be shared among a plurality of users; and
in a case where an instruction to change a name associated with the operator is received, setting a display setting of the destination information associated with the operator to non-display of not displaying the destination information.

20. An information processing method comprising:
controlling an operator, which is an icon, which is used to execute a new job using setting content of a job executed in the past and is associated with a process of transmitting target data to a transmission destination of destination information set in advance, to be shared among a plurality of users; and
in a case where an instruction to change a name associated with the operator is received, setting a display setting of the destination information associated with the operator to non-display of not displaying the destination information.

* * * * *